United States Patent
Andrews et al.

(10) Patent No.: US 6,827,811 B2
(45) Date of Patent: Dec. 7, 2004

(54) METHOD FOR VACUUM PRESSING ELECTROCHEMICAL CELL COMPONENTS

(75) Inventors: Craig C. Andrews, College Station, TX (US); Oliver J. Murphy, Brayn, TX (US)

(73) Assignee: Lynntech, Inc., College Station, TX (US)

(*) Notice: Subject to any disclaimer, the term of this patent is extended or adjusted under 35 U.S.C. 154(b) by 141 days.

(21) Appl. No.: 10/072,303

(22) Filed: Feb. 7, 2002

(65) Prior Publication Data

US 2003/0145942 A1 Aug. 7, 2003

(51) Int. Cl.[7] .................................................. B29C 65/48
(52) U.S. Cl. ................ 156/285; 156/291; 156/292; 429/12; 429/149; 429/152
(58) Field of Search ................ 156/285–286, 156/290–292, 295, 382; 429/149, 152, 185, 162, 209, 150–155, 12, 30–46; 29/623.4, 623.5

(56) References Cited

U.S. PATENT DOCUMENTS

| | | | | |
|---|---|---|---|---|
| 3,803,068 A | * | 4/1974 | Mestetsky et al. | 524/140 |
| 4,744,199 A | | 5/1988 | Gannon | |
| 4,756,140 A | | 7/1988 | Gannon | |
| 5,206,756 A | * | 4/1993 | Cheshire | 359/270 |
| 5,300,206 A | * | 4/1994 | Allen et al. | 204/284 |
| 5,724,187 A | * | 3/1998 | Varaprasad et al. | 359/608 |
| 5,742,006 A | * | 4/1998 | Grupp et al. | 174/52.2 |
| 5,893,822 A | | 4/1999 | Deni et al. | |
| 6,080,503 A | * | 6/2000 | Schmid et al. | 429/35 |
| 6,145,280 A | | 11/2000 | Daroux et al. | |
| 6,156,080 A | * | 12/2000 | Kumeuchi et al. | 29/623.1 |
| 6,256,968 B1 | | 7/2001 | Kristen | |
| 6,294,279 B1 | * | 9/2001 | Taira | 429/30 |
| 6,495,278 B1 | | 12/2002 | Schmid et al. | |
| 6,635,138 B1 | * | 10/2003 | Choi | 156/230 |
| 2001/0006092 A1 | * | 7/2001 | Ikai et al. | 156/330 |
| 2002/0031698 A1 | * | 3/2002 | Inoue et al. | 429/35 |
| 2002/0037499 A1 | * | 3/2002 | Quake et al. | 435/5 |
| 2003/0031914 A1 | | 2/2003 | Frank et al. | |
| 2003/0145942 A1 | | 8/2003 | Andrews et al. | |

FOREIGN PATENT DOCUMENTS

| | | |
|---|---|---|
| EP | 0 604 683 A1 | 12/1992 |
| EP | 1263068 A1 | 4/2002 |
| WO | WO 99/56954 * | 11/1999 ........... B32B/31/26 |

OTHER PUBLICATIONS

Partial International Search, PCT/US 03/05702, 2 pages.
International Search Report; 7 pages; International Application No. PCT/US 03/05702; International Filing Date Feb. 24, 2003.

* cited by examiner

Primary Examiner—Jeff H. Aftergut
Assistant Examiner—Jessica Rossi
(74) Attorney, Agent, or Firm—Streets & Steele; Jeffrey L. Streets; Frank J. Campigotto

(57) ABSTRACT

Assembling electrochemical cell components using a bonding agent comprising aligning components of the electrochemical cell, applying a bonding agent between the components to bond the components together, placing the components within a container that is essentially a pliable bag, and drawing a vacuum within the bag, wherein the bag conforms to the shape of the components from the pressure outside the bag, thereby holding the components securely in place. The vacuum is passively maintained until the adhesive has cured and the components are securely bonded. The bonding agent used to bond the components of the electrochemical cell may be distributed to the bonding surface from distribution channels in the components. To prevent contamination with bonding agent, some areas may be treated to produce regions of preferred adhesive distribution and protected regions. Treatments may include polishing, etching, coating and providing protective grooves between the bonding surfaces and the protected regions.

28 Claims, 5 Drawing Sheets

METHOD FOR VACUUM PRESSING ELECTROCHEMICAL CELL COMPONENTS

This invention was made with government support under subcontract number 5402 which was a subcontract awarded under NASA contract NCC2-4004. The government has certain rights in this invention.

BACKGROUND OF THE INVENTION

1. Field of the Invention

The present invention relates to assembling electrochemical cell components. More particularly, the invention relates to using a bonding agent such as cements, glues, solders, adhesives and the like to bond components or subassemblies of an electrochemical cell or stack.

2. Description of the Related Art

Conventional construction of fuel cell stacks, electrolyzer stacks, or gas (hydrogen or oxygen) concentrator stacks, especially proton exchange membranes (PEM) stacks, requires a large number of substantially flat or planar components or subassemblies (including bipolar plates, flowfields, membrane and electrode assemblies, and, optionally, cooling plates) to be assembled between a pair of heavy metal endplates. The entire assembly is normally placed in compression, much like a filter press, through the use of a series of long threaded metal rods (tie rods) extending from one endplate of the assembly to the other endplate, with nuts or other fasteners on either end. The compression forces exerted through the tie rods normally compress a gasket, o-ring or similar device that is inserted between the sealing surfaces, thereby sealing any gases or liquids inside the electrochemical cell stack.

Electrochemical stacks are beginning to include adhesives for bonding the electrochemical cell stack components together, without the need for heavy endplates, tie bars, gaskets or o-rings. The adhesive bonds the components together and seals the gases and/or liquids inside the electrochemical cell stack. The resulting electrochemical cell stack is much lighter and smaller than a traditional stack. While each o-ring and gasket is not heavy itself, these components nevertheless increase the size, weight and complexity of an electrochemical stack due to design constraints related to the use of seals such as o-rings and other elastomers.

Thermoplastic adhesives are often the preferred adhesives for bonding the parts of an electrochemical cell stack. These adhesives must be heated in an oven for curing after being applied to the components. Other adhesives that may be used include reactively cured adhesives and solvent loss adhesives. However, regardless of the type of bonding agent (adhesive, glue, cement, solder, or the like) used, the components must be held in place while the bonding agent dries or is cured. Many types of clamps and jigs are used to hold the components in place or alternatively, the weight of the components themselves may be sufficient to hold the components together while the adhesive cures. Often, the clamps are so large and bulky that the components cannot be placed in an oven for the adhesive to cure. Applying the adhesive quickly, while keeping the adhesive away from areas where the adhesive may clog or otherwise damage the components, is quite difficult. It is also a problem to keep the components properly compressed during storage of component assemblies before the components are heated in an oven for proper adhesive curing. Furthermore, it is a problem to keep the adhesive from running to undesirable areas while it is in the oven. The present invention provides a solution to these problems.

Therefore, there is a need for a method and apparatus for assembling electrochemical cell components and subassemblies that facilitates the use and application of a bonding agent between the components. It would be desirable if the method and apparatus were simple to perform and operate, yet made efficient use of equipment that is found in a common laboratory. It would also be desirable if the method enabled both the assembly of custom components and subassemblies and large-scale assembly-line production of electrochemical cell components into bonded unitary structures

SUMMARY OF THE INVENTION

The present invention provides a method of assembling electrochemical cell components, comprising aligning first and second electrochemical cell components; providing a bonding agent between the first and second electrochemical cell components; placing the aligned components into a container consisting essentially of a pliable bag; and drawing a vacuum within the pliable bag, wherein the pliable bag molds to a shape of the aligned components. The method may further comprise applying pressure to the outside of the vacuum bag, wherein the pressure is selected from hydrostatic pressure and pneumatic pressure, or placing the sealed vacuum bag containing the components into an oven. Optionally, the method may further comprisedistributing the bonding agent through one or more closed channels formed between the first and second electrochemical cell components. The optional step of distributing the bonding agent through one or more closed channels may further comprise adding the bonding agent into an upward-facing open channel in the bonding surface of the first component; creating the closed channel when the second component is aligned with the first component; and inverting the components, wherein the bonding agent flows against the second component by means selected from gravity, capillary action and combinations thereof. A plurality of supports may be disposed in the open channel or in the second component, wherein the method further comprises supporting a section of the second component that covers the open channel; supporting the open channel, wherein the first and second components do not deform from pressure exerted by the pliable bag.

The step of distributing the bonding agent through a channel further comprises adding a bonding agent into the closed channel though one or more fill ports, wherein the one or more fill ports are in fluid communication with the closed channel. The bonding agent source is a syringe, pump, or other delivery device having a conduit adapted to form a seal with each of the one or more fill ports, the method further comprising injecting a bonding agent into the closed channel from the delivery device. Optionally, an overfill reservoir is provided in fluid communication with the closed channel, the method further comprising capturing excess bonding agent flowing from the closed channel into the overfill reservoir.

The invention also provides a subassembly of electrochemical cell components, comprising a first component having a first bonding surface with one or more open channels, wherein the one or more open channels contain a bonding agent; and a second component having a second bonding surface aligned with the first bonding surface of the first component. Optionally, the subassembly may further comprise a plurality of supports disposed within the one or more open channels or extending from the second bonding surface, wherein the supports prevent the atmospheric or applied external pressure from deforming the first component or the second component along the one or more open channels. Preferably, the subassembly also includes a bonding agent delivery reservoir in fluid communication with the one or more channels, and a bonding agent disposed in the reservoir. Optionally, the bonding agent reservoir is adapted to expose the bonding agent to externally applied fluid pressure. An overflow reservoir may also be included in fluid communication with an opposing end of the one or more channels from the bonding agent reservoir. In one embodiment, the subassembly has opposing bonding surfaces on the first and second electrochemical cell components, wherein the bonding surfaces have been treated to enhance flow of the bonding agent; and opposing non-bonding surfaces on the first and second electrochemical cell components, wherein the non-bonding surfaces have been treated to inhibit flow of the bonding agent. Optionally, the bonding surfaces may be treated by a process selected from applying a wetting agent, polishing, etching and combinations thereof. Separately, the non-bonding surfaces may be treated by a process selected from roughening, chemically modifying, coating, and combinations thereof. The non-bonding surfaces may be coated with polytetrafluoroethylene (PTFE) or perfluoroalkoxy (PFA). Furthermore, the bonding surfaces may have a plurality of surface features, such as micro grooves. Preferably, the method includes maintaining alignment of the cell components by interlocking one or more feature between the first and second cell components, where an exemplary interlocking feature is a pin.

Finally, the invention provides a method of assembling electrochemical cell components, comprising aligning first and second electrochemical cell components; providing a bonding agent between the first and second electrochemical cell components; placing the aligned components into a pliable bag; placing the pliable bag within a vacuum chamber; and drawing a vacuum on the vacuum chamber. The method may further comprise sealing the bag to retain the vacuum within the bag; and removing the sealed bag from the vacuum chamber, wherein the pliable bag molds to a shape of the components. The vacuum may be maintained inside the sealed bag as desired, such as until the bonding agent has cured.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
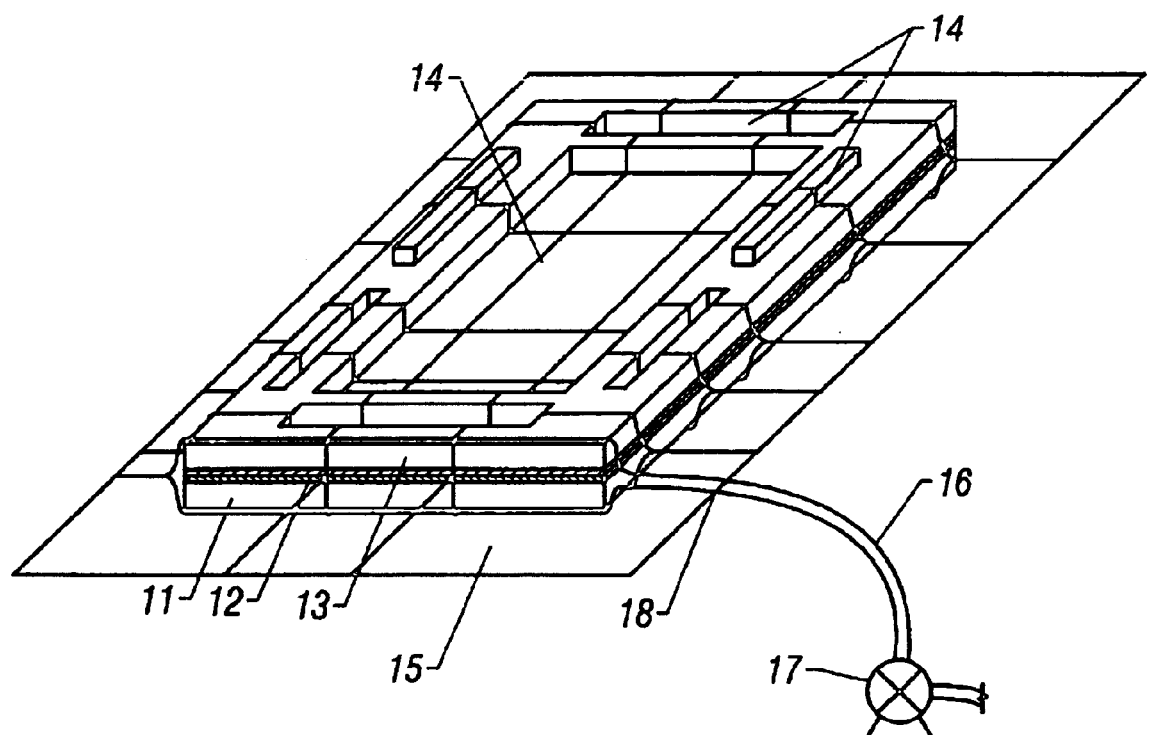
FIG. 1 is a perspective view of a subassembly contained within a vacuum bag in accordance with the present invention.

The present invention provides a method for assembling electrochemical cell components and subassemblies using bonding agents such as cements, mortar, or adhesives to bond the components of the electrochemical cell. The method entails aligning components of the electrochemical cell, applying an adhesive between the components to bond the components together, placing the components within a container that is essentially a pliable bag, and drawing a vacuum within the bag, wherein the bag conforms to the shape of the components from the pressure outside the bag, thereby holding the components securely in place. The vacuum is maintained until the adhesive has cured and the components are securely bonded.

In one embodiment of the invention, components of the electrochemical cell are coated with an adhesive around the bonding surfaces of the components. The components are then carefully assembled to ensure that each component is properly aligned with the other components. The assembled components are then placed in a bag made of a pliable or resilient material that is capable of conforming to the shape of the components. The bag may be made of any pliable material strong enough to hold the components in place and capable of keeping air or other gases and liquids from leaking back into the bag. Many vacuum bags, for example, are made of a nylon/polyethylene combination material, normally having a thickness of between about 2 mil and 7 mil. Nylon is preferably used in the bag construction to provide a longer vacuum life because without the nylon, air from the outside atmosphere will refill the bag in just a few hours. Alternatively, a polyethylene bag may be used when adhesive cure time is short. Preferably, the bags are disposable. Also, to preserve alignment of the components, it may be desirable for the inside surface of the bag to be roughened, corrugated, or otherwise have a high coefficient of friction.

After the components have been placed in the bag, a vacuum is drawn on the bag. Many vacuum sealers have a nozzle that is inserted into the vacuum bag through which the vacuum is drawn. After the vacuum is pulled on the bag, the vacuum sealer melts a strip of the plastic bag. Melting the strip on the bag seals the plastic bag, thereby maintaining the vacuum inside the bag. Alternatively, any means of sealing the bag is adequate, including mechanical means.

Optionally, the bag or containing the components may be placed in a vacuum chamber and the vacuum pulled both inside the bag and outside the bag, giving a more controlled amount of vacuum to be applied. This option may be preferable if a reduced vacuum is desired; i.e., a vacuum having sufficient force to hold the components in place, but not so forceful as to cause the components to deform. Another benefit of this option is that air that could potentially become entrained in the adhesive may be drawn off as the vacuum is pulled before the bag is sealed, thereby ensuring there are no air bubbles to interfere with the bonding of the surfaces. A manufacturer of vacuum sealers is AmeriVacS, a California Corporation. AmeriVacS manufactures both a traditional nozzle type vacuum sealer and the chamber type vacuum sealer. Alternatively, simply running a hose from a vacuum pump to the bag and thereby pulling a vacuum will suffice, as any means that pulls a vacuum on the bag, allowing the bag to conform to the shape of the components to be held, is adequate and any means of sealing the bag, after the vacuum has been pulled, is adequate.

The pressure outside the bag makes the bag conform to the shape of the components as the vacuum is drawn from inside the bag. The normal atmospheric pressure generally is adequate to securely hold the components in place and provide the necessary compression while the adhesive is curing. However, if additional pressure is required, a supplemental source of hydrostatic or pneumatic pressure may be applied to the outside of the bag, providing an outer pressure greater than normal atmospheric pressure, and thereby exerting a greater pressure on the adhesively bonded parts. The higher pressure may clamp the component parts more securely and may also provide higher compressive forces between the components, thereby subjecting the adhesive to a higher compressive force. The increased compressive force may better expel any gas bubbles from the adhesive, and it may improve the adhesive's flow along the surfaces to be bonded. The amount of pressure applied to the components is the differential pressure across the bag, i.e., the outside pressure less the inside pressure.

In another embodiment of the present invention, the adhesive used to bond the components of the electrochemical cell may be distributed to the bonding surface from adhesive channels in the components. When several electrochemical cell components must be bonded together to form several units, as in a manufacturing process, carefully brushing or otherwise carefully applying the adhesive to the bonding surfaces may take an inordinate amount of time. By forming an adhesive channel in the bonding surface of a first component, the channel may be filled quickly with adhesive. A bonding surface of the second component may then be properly aligned with the bonding surface having the adhesive channel. The components may then be placed in a bag, and the components oriented such that the adhesive can flow out of the adhesive channel. When a vacuum is then applied to the bag, the adhesive will flow from the adhesive channel by capillary action combined with the vacuum pressure, allowing the adhesive to be distributed across the bonding surfaces. Alternatively, the adhesive could be injected through ports into the adhesive channel after the components were pressed or vacuum pressed together. In yet another alternative, the bag may be used to push the adhesive out of a reservoir into the channels during the vacuum pressing. Optionally, an overfill reservoir may be formed to receive excess adhesive.

In electrochemical cell components, there are often areas that should not be contaminated with adhesive. These areas may be, for example, the manifolds and distribution flow channels that distribute reactants and cooling or heating fluids to the electrochemical cells. These manifolds and flow channels pass through or upon the frames of the electrochemical cell components. If these manifolds or flow channels become contaminated with adhesive, then the adhesive plugs the channels and prevents the required flow of the fluids.

To prevent the contamination of the flow channels and manifolds with the adhesive, the frame of the electrochemical cell components may be treated to produce regions of preferred adhesive distribution and regions to be kept free of adhesive, such as around the manifold areas of the frame. This may be accomplished by roughening, providing microchannels, polishing, etching, chemically modifying, or coating to form regions that protect a feature. For example, polytetrafluoroethylene may be used to coat regions to be kept free of adhesive, such as the areas surrounding the manifolds. Likewise, a wetting agent may be used to coat regions of preferred adhesive distribution, the bonding area for the adhesive. An epoxy or other adhesive could then be applied to the main sealing and bonding area and a contact adhesive could be applied to the polytetraflouroethylene coated areas to provide a temporary bond to facilitate handing before the adhesive is cured. Alternatively, the alignment of the cell components may be secured by interlocking one or more feature, such as a pin, between the first and second cell components.

When a channel having a large area is to be applied with adhesive, supports may be provided to prevent the components from bending into the channels created for the adhesive flow and to form a uniformly thick layer of adhesive. These supports may be placed into the flow channel or the supports may be left behind during the formation of the adhesive channels. Alternatively, the supports may extend into the flow channel from the component covering the flow channel. A flow channel is an open channel if the channel is not fully enclosed. Therefore, a groove cut into the surface of a component to be filled with adhesive is an open channel. When a second component is aligned with the first component having the open adhesive channel, then the channel becomes a closed channel since the second component enclosed the channel.

FIG. 1 is a perspective view of a subassembly contained within a vacuum bag in accordance with the present invention. Components 11, 12, 13 are aligned and placed in a nylon-polyethylene bag 15 to be adhesively bonded. A hose 16 is connected to the bag 15 and to a vacuum source 17. As a vacuum is drawn inside the bag 15, the bag collapses and molds itself to the approximate shape of the components 11, 12, 13. The bag is pliable enough that it molds itself to the surface features 14 of the components. Such features 14 include, for example, depressions, extensions, corners, and holes. After the vacuum has been established within the bag, the hose 16 is withdrawn from the entrance 18 to the bag, and the entrance 18 is then sealed, usually by melting the plastic sides of the bag. The components 11, 12, 13 are then securely held in place and in alignment by the pliable bag 15.

There are many devices on the market that are designed to vacuum pack objects inside a pliable bag that molds itself to the surface of the object. A suitable vacuum device is available from AmeriVacS, a California corporation, including devices that will pull a vacuum on the pliable bag and then seal the bag by melting the plastic sides of the bag. The bag is thereby hermetically sealed to prevent any air or other fluid from leaking into the bag.

The pressure exerted by the atmosphere holds the components tightly together through the plastic bag that molds itself to the components. If additional holding pressure is desired, the bag may be placed in a chamber (not shown) that exerts additional hydrostatic pressure, pneumatic pressure, or other fluid pressure.

Figure 2:
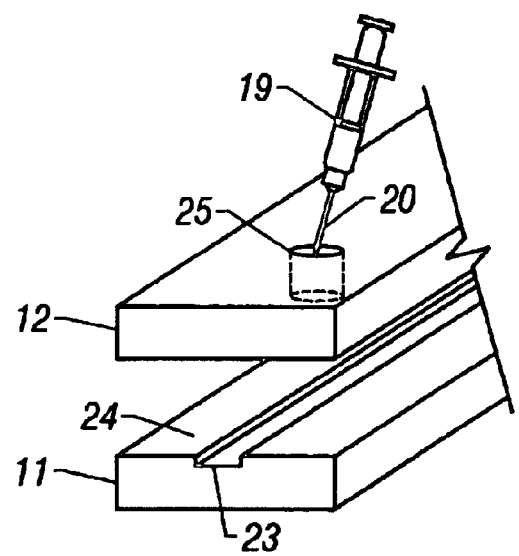
FIG. 2 is a perspective view of an adhesive channel included within a bonding surface of a component.

FIG. 2 is a perspective view of an adhesive channel contained within the bonding surface of a component in accordance with the present invention. An adhesive distribution channel 23 is cut or formed within the bonding surface 24 of a component 11. Adhesive may be added to the channel 23 and then a second component 12 may be aligned to the first component 11 so that the components 11, 12 may be bonded together with the adhesive. After the aligned components have been placed in the bag 15, shown in FIG. 1, the components 11, 12 may be inverted so that the adhesive flows out of the channel 23 by gravity. As a vacuum is pulled on the bag 15, the vacuum extraction, as well as capillary action, pulls the adhesive into the bonding area surface 24.

Alternatively, adhesive may be added to the adhesive channel 25 after the components 11, 12 have been aligned. One or more fill ports 25 may be placed strategically along the adhesive channel 23 for adding adhesive after the second component 12 has been aligned and covered the adhesive channel 23. The one or more fill ports 25 are in fluid communication with the adhesive channel 23. Adhesive may be poured through the fill ports 25 or a syringe, pump, or other delivery device 19 may be used to inject adhesive through the fill ports 25 into the adhesive channel 23. The fill ports 25 may be adapted to receive a syringe tip or conduit 20 for injecting adhesive. The fill port 25 may be adapted to provide a friction fit with the syringe tip 20 or the fill port may be adapted with a septum (not shown) for the conduit 20 to pass through, thereby providing a seal.

If a syringe is used, the adhesive may be injected into the fill ports 25 before or after the vacuum is pulled on the bag 15. The syringe may inject into the fill ports 25 after the components have been placed in the bag 15 by puncturing the bag 15 with the syringe tip 20. The small hole punched in the bag by the syringe tip 20 may be sealed after the tip is removed by placing a piece of tape over the hole, by applying heat to melt the sides of the hole together or by other sealing means.

Figure 3:
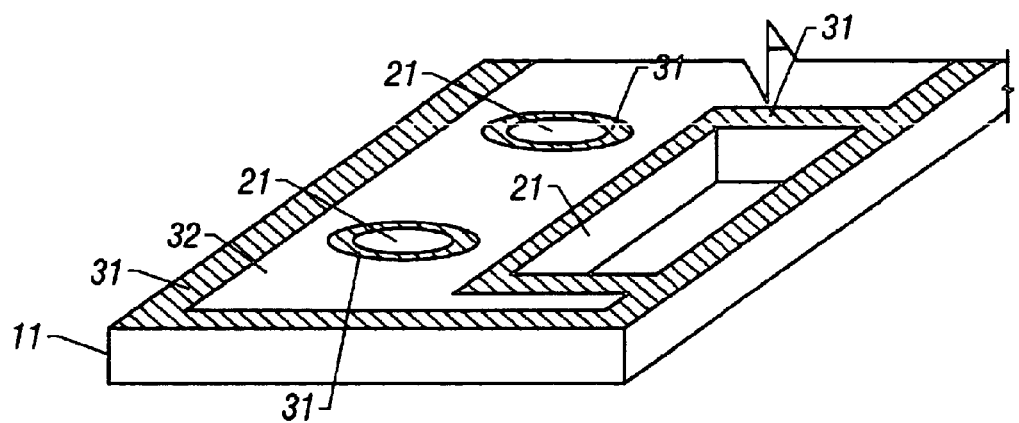
FIG. 3 is a perspective view of a subassembly component treated to provide regions of preferred adhesive distribution.

FIG. 3 is a perspective view of a subassembly component treated to provide regions of preferred adhesive distribution in accordance with the present invention. A component 11 may have regions of preferred adhesive distribution 32 and protected regions 21 that must be protected from adhesive contamination. Boundary areas 31 may be created to help prevent adhesive from contaminating the protected regions 21.

The areas of preferred adhesive distribution 32, which are the bonding surfaces, may be created by surface treating techniques. These techniques may be selected from, for example, polishing, etching, application of a wetting agent, micro grooves and combinations thereof. The surface treating techniques could be any technique that would enhance the flow of adhesive over the surface, thereby ensuring an even and full application of adhesive over the bonding surface. Examples of wetting agents suitable for use in this application may be anionic, cationic, or neutral surfactants, soap, detergents or other surface-active compounds.

Protected regions 21 that are protected from adhesive contamination may include, for example, manifold areas where adhesive contamination may result in a manifold being plugged off or outside edges of the component 11 where adhesive leakage may be unsightly or cause the bag 15, shown in FIG. 1, to stick to the component 11.

Boundary regions 31 may be created by surface treatment to prevent adhesive from flowing from the areas of preferred adhesive distribution 32 to the protected regions 21. Surface treatments that provide a suitable boundary region may be selected from roughening, chemically modifying, coating, or providing protective channels. For example, a polytetrafluoroethylene coating on the boundary region 31 may provide the required protection from adhesive contamination to the protected regions 21. Optionally, a contact adhesive may be applied to the boundary region 31 to provide a temporary bonding to maintain alignment and to provide an additional protective barrier or initial seal around the protected regions 21.

Figure 4:
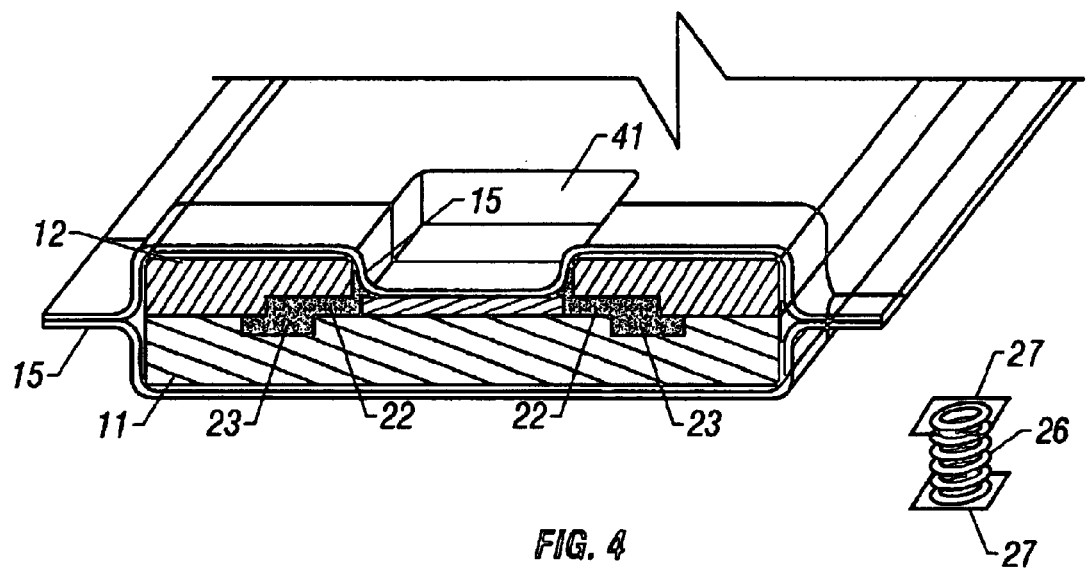
FIG. 4 is a perspective view of a subassembly of components having an adhesive reservoir.

FIG. 4 is a perspective view of a subassembly of components having a adhesive reservoir in accordance with the present invention. An adhesive reservoir 41 is contained within component 12 and is in fluid communication with adhesive channels 23 in component 11 through distribution channels 22. The adhesive reservoir 41 may be filled with adhesive. During vacuum pressing, the bag 15 is pushed into the adhesive reservoir 41 as the bag molds itself to the approximate shape of the components 11, 12. As the bag 15 is pushed into the adhesive reservoir 41, the adhesive is pushed out of the reservoir 41 into the distribution channels 22 and into the adhesive channels 23, thereby being distributed to the bonding surfaces. Optionally, a spring 26 mounted between two plates 27 may be placed in the adhesive reservoir 41 to push back against the bag 15 as it molds to the shape of the components 11, 12. The force of the spring 26 will slow the flow of the adhesive into the distribution channels 22 by slowing the ingress of the bag 15 into the adhesive reservoir 41.

Figure 5:
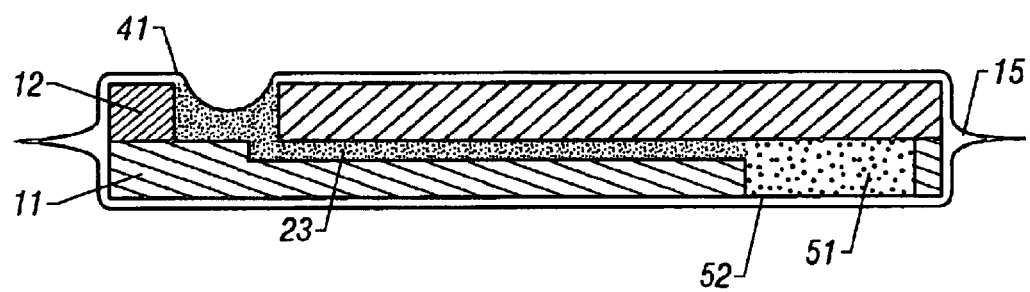
FIG. 5 is a perspective view of a subassembly component having an overflow reservoir.

FIG. 5 is a perspective view of a subassembly component having an overflow reservoir in accordance with the present invention. An overflow reservoir 51 is shown formed within component 11 and in fluid communication with an adhesive channel 23. As the adhesive is being pushed into the adhesive channel 23 from an adhesive reservoir 41 or from a syringe or other source, excess adhesive may flow into the overflow reservoir 51 to prevent the adhesive from pushing into non-bonding surface areas. A cover 52 over the overfill reservoir prevents the bag 15 from pushing into the reservoir during the vacuum pressing. A separate cover 52 is not required if the overflow reservoir is not cut all the way through the component 11. Alternatively, the reservoir may be packed with a loose material to prevent the bag 51 from pushing into the reservoir 51 but still allowing excess adhesive to flow into the reservoir.

Figure 6:
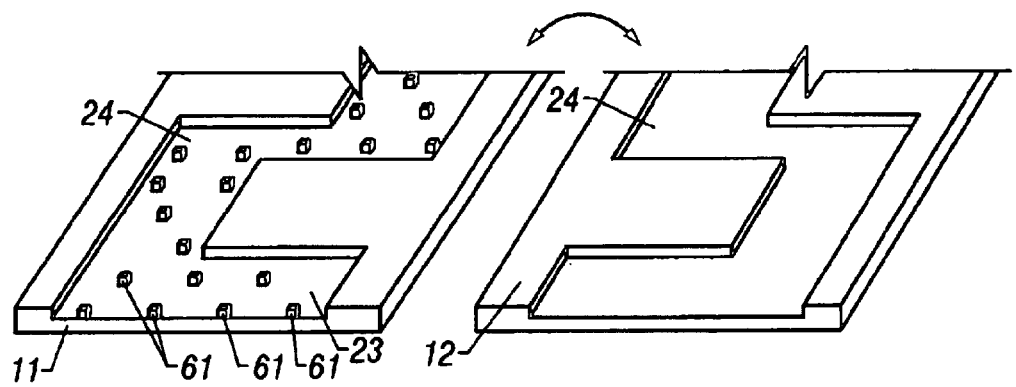
FIG. 6 is a perspective view of an adhesive channel containing supports.

FIG. 6 is a perspective view of an adhesive channel containing supports in accordance with the present invention. Supports 61 may be provided in the adhesive channel 23 or the bonding surface to prevent the deformation of the components 11, 12 during vacuum pressing. When the first component 12 is aligned with the second component 11, the supports 61 will contact the bonding surface 24 of the second component 12. Because the bonding area is large, during vacuum pressing the components 11, 12 could deform due to the exerted pressure. The supports 61 prevent the deformation of the components 11, 12. Alternatively, the supports could extend from the second component 12 into the adhesive channel 23, or the supports could extend from both components. The supports 61 could be molded into the components 11, 12, fastened into the components or otherwise secured in the components.

Figure 7A:
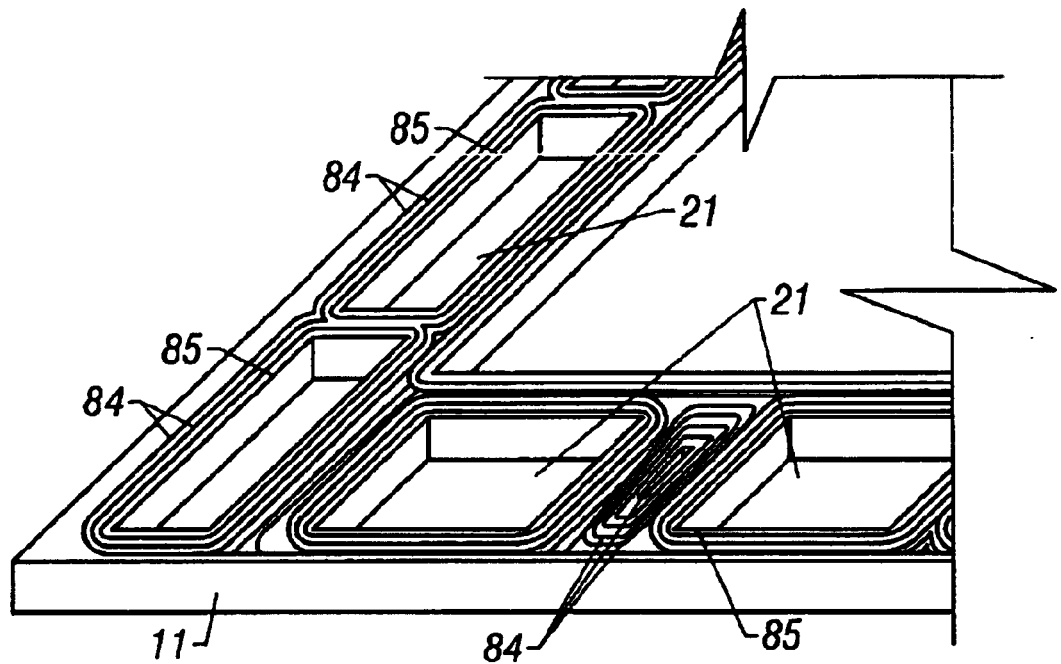
FIG. 7 is a perspective view of a subassembly component having micro grooves and guard grooves.
Figure 7B:
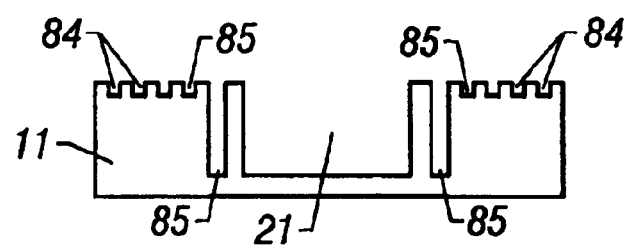

FIG. 7 is a perspective view of a subassembly component having surface features such as depressions or ridges in accordance with the present invention. FIGS. 7a and 7b are cross sections of one of the components to be bonded 11. Surface features such as micro grooves 84 may be formed or cut in the bonding surface of a subassembly component 11 to hold adhesive and to provide multiple sealing regions, thereby ensuring a tight seal between the bonded components 11, 12.

The micro grooves are not cut very deeply into the bonding surface, normally between about 0.1 mm and 2 mm. Alternatively, the grooves may be replaced by ridges, also defining the area between regions of preferred spreading of the bonding agent and regions of exclusion of the bonding agent.

An advantage of the micro grooves is that the micro grooves provide many locations for any air bubbles from the adhesive to escape. When adhesive is added to the micro grooves, and after the components are aligned, the components are turned over so that the adhesive can flow from the grooves by gravity. Entrained or captured air bubbles may then rise to the top of the grooves. Additionally, any air bubbles are divided into small air bubbles because the ridges of the micro grooves divide any air bubbles. By making the air bubbles small and providing a path of escape for the air bubbles, the air bubbles will not interfere with the bonding of the components.

Additionally, guard grooves 85 or other surface feature such as ridges (not shown) may also be provided. Guard grooves provide protection against adhesive contamination around protected areas 21. The guard grooves may be either micro grooves surrounding protected areas 21 or a deep groove surrounding protected areas 21. As adhesive flows or is applied to the bonding surface, the guard grooves 85 collect any excess adhesive and prevent the adhesive from reaching the protected areas 21.

Figure 8:
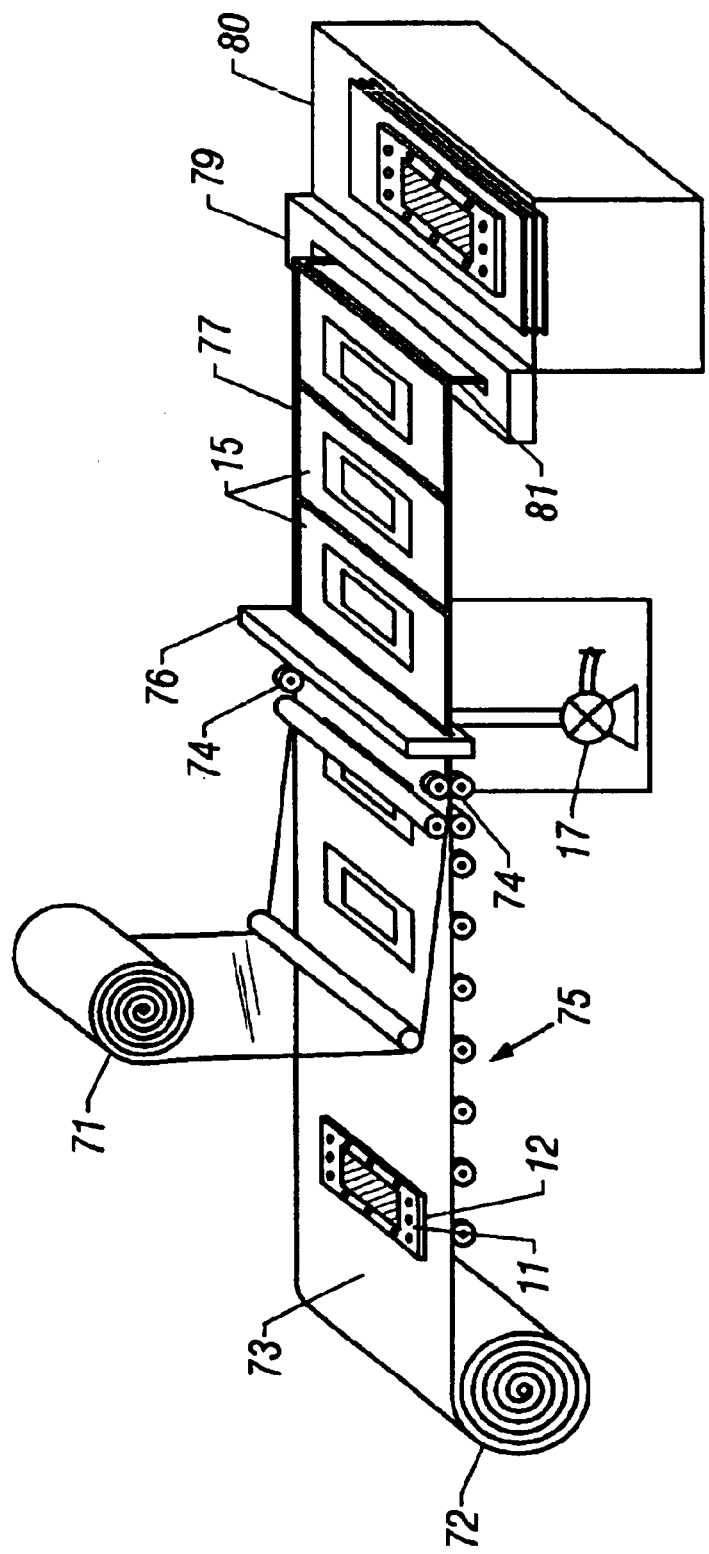
FIG. 8 is a schematic drawing of a manufacturing process that may be implemented in accordance with the present invention.

FIG. 8 is a schematic drawing of a process that may be implemented in accordance with the present invention. A subassembly 73 is comprised of components 11, 12 that have been aligned and will be bonded using an adhesive. Rolls 71, 72 of a nylon-polyethylene blend, or other suitable material, are fed along a conveyer with the subassembly 73. Heated rollers 74 on either side seal the edges of the two sheets of plastic fed from the rolls 71, 72 by melting the edges of the two sheets together, thereby creating a bag 15. A vacuum source 17 pulls a vacuum inside the bag 15 and a sealer 76 seals the bag 15 by melting a strip of the plastic. A knife blade 79 cuts the bags 15 apart and they are deposited in a collection tray 80 for transport to an oven for curing the adhesive or for other processing as required.

It will be understood from the foregoing description that various modifications and changes may be made in the preferred embodiment of the present invention without departing from its true spirit. It is intended that this description is for purposes of illustration only and should not be construed in a limiting sense. Only the language of the following claims should limit the scope of this invention.

What is claimed is:

1. A method of assembling electrochemical cell components, comprising:
   adding a bonding agent into an upward-facing open channel in a bonding surface of a first electrochemical cell component;
   aligning the first electrochemical cell component with a second electrochemical cell component;
   creating one or more closed channels when the second component is aligned with the first component;
   distributing the bonding agent through the one or more closed channels;
   supporting both a section of the second component that covers the open channel and the open channel, wherein support is provided by one or more supports disposed in the open channel of the first component, by one or more supports protruding from a section of the second component that covers the open channel, or by combinations thereof;
   placing the aligned components into a container consisting essentially of a pliable bag; and
   drawing a vacuum within the pliable bag, wherein the pliable bag molds to a shape of the aligned components.

2. The method of claim 1, further comprising:
   applying pressure to the outside of the pliable bag, wherein the pressure is selected from hydrostatic pressure and pneumatic pressure.

3. The method of claim 1, further comprising:
   placing the sealed pliable bag containing the components into an oven.

4. The method of claim 1, wherein the step of distributing the bonding agent through one or more closed channels further comprises:
   inverting the components, wherein the bonding agent flows against the second component by means selected from gravity, capillary action and combinations thereof.

5. The method of claim 1, wherein an overfill reservoir is in fluid communication with the closed channel, the method further comprising:
   capturing excess bonding agent flowing from the closed channel into the overfill reservoir.

6. The method of claim 1, further comprising:
   providing a feature along an interface between the first and second electrochemical cell components and between a bonding area and a non-bonding area;
   retaining and confining excess bonding agent to a region bounded by the feature to prevent the bonding agent from reaching the non-bonding area.

7. The method of claim 1, wherein the first and second components are placed in the pliable bag without an alignment frame.

8. The method of claim 1, wherein the vacuum inside the pliable bag is maintained without maintaining a connection to a vacuum source.

9. The method of claim 1, further comprising:
   maintaining the vacuum within the bag until the bonding agent has cured.

10. The method of claim 1, further comprising:
    maintaining alignment of the cell components by disposing the bonding agent between the components.

11. The method of claim 10, wherein the bonding agent is a contact adhesive.

12. The method of claim 1, wherein the pliable bag is made of a material selected from polyethylene and a nylon-polyethylene blend.

13. The method of claim 12, wherein the pliable bag has a thickness of between about 2 mils and about 7 mils.

14. The method of claim 1, further comprising:
    maintaining alignment of the cell components by interlocking one or more feature between the first and second cell components.

15. The method of claim 14, wherein the one or more interlocking feature is a pin.

16. The method of claim 1, further comprising:
    treating a bonding surface on the first and second electrochemical cell components to enhance flow of the bonding agent; and
    treating a non-bonding surface on the first and second electrochemical cell components to inhibit flow of the bonding agent.

17. The method of claim 16, wherein the step of treating a bonding surface comprise a process selected from applying a wetting agent, polishing, etching and combinations thereof.

18. The method of claim 16, wherein the step of treating a bonding surface comprises applying a wetting agent selected from detergents, soaps, surfactants, anionic, and cationic surface active compounds.

19. The method of claim 16, wherein the step of treating a non-bonding surface comprises a process selected from roughening, chemically modifying, coating, and combinations thereof.

20. The method of claim 1, father comprising:
sealing the bag to retain the vacuum within the bag.

21. The method of claim 20, wherein the step of sealing the bag further comprises melting unsealed edges of the bag together.

22. The method of claim 20, wherein the step of sealing the bag includes hermetically sealing the bag.

23. The method of claim 20, further comprising:
maintaining the vacuum within the bag.

24. The method of claim 1, wherein the step of distributing the bonding agent through a channel further comprises:
adding a bonding agent into the closed channel though one or more fill ports, wherein the one or more fill ports are in fluid communication with the closed channel.

25. The method of claim 24 wherein the bonding agent source is a syringe, pump, or other delivery device having a conduit adapted to form a seal with each of the one or more fill ports, the method further comprising:
injecting a bonding agent into the closed channel from the delivery device.

26. The method of claim 24, wherein the bonding agent source is an open reservoir in one or more of the components, the method further comprises:
pushing the bonding agent into the closed channel with the pliable bag as the vacuum causes the pliable bag to mold to the shape of the reservoir.

27. The method of claim 26, wherein the reservoir contains a spring pushing against the pliable bag, the method further comprises:
maintaining pressure with the spring against a portion of the pliable bag molding to the shape of the reservoir, wherein the spring limits a speed at which the bonding agent is forced from the reservoir.

28. The method of claim 26, wherein an overfill reservoir is in fluid communication with the closed channel, the method further comprising:
capturing excess bonding agent flowing from the closed channel into the overfill reservoir.

* * * * *